Nov. 15, 1960 A. L. SELKE 2,959,844
RADIATOR SOLDERING
Filed Sept. 10, 1956
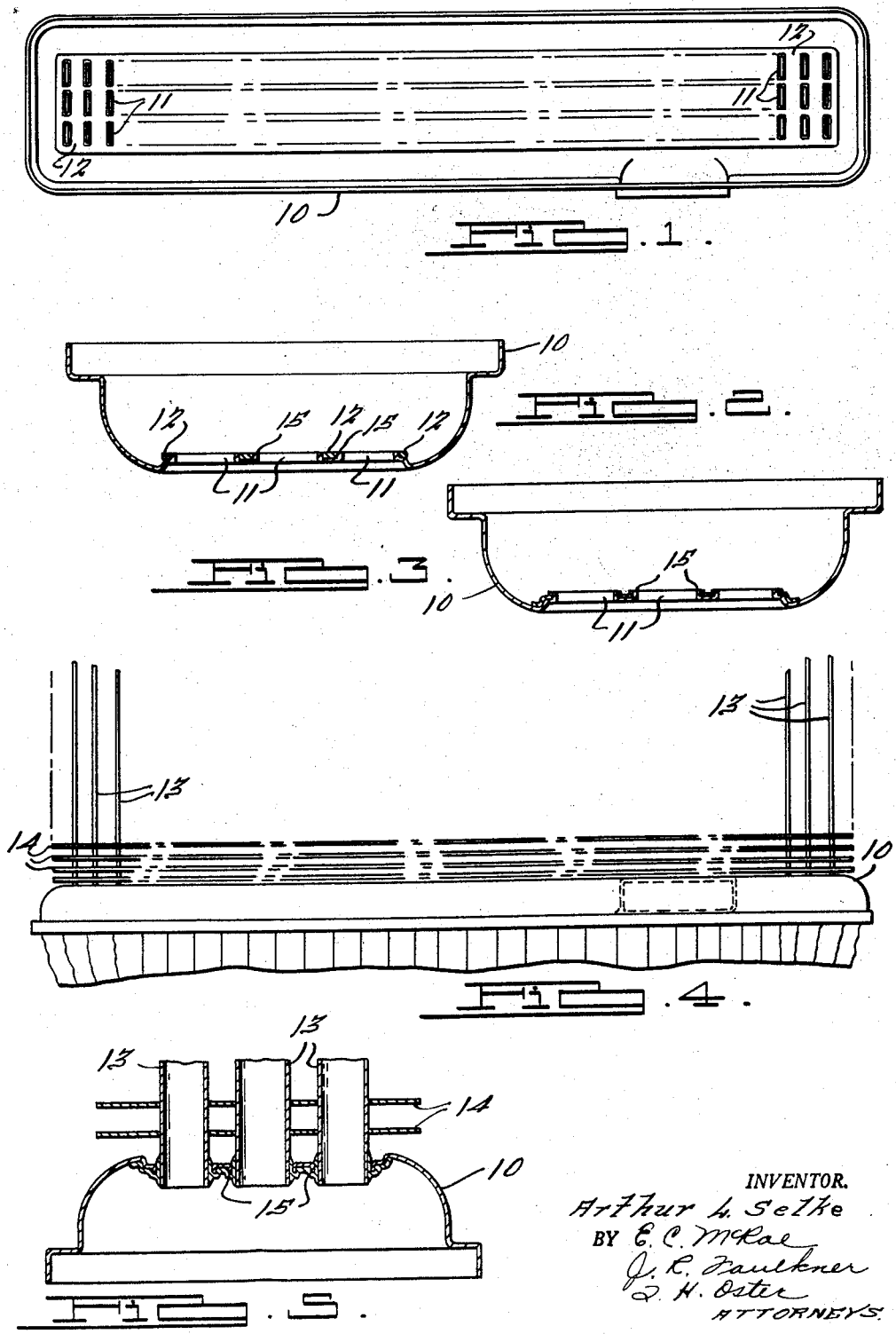
INVENTOR.
Arthur L. Selke
BY E. C. McRae
J. R. Faulkner
D. H. Oster
ATTORNEYS

United States Patent Office 2,959,844
Patented Nov. 15, 1960

2,959,844

RADIATOR SOLDERING

Arthur L. Selke, Livonia, Mich., assignor to Ford Motor Company, Dearborn, Mich., a corporation of Delaware Filed Sept. 10, 1956, Ser. No. 608,821

5 Claims. (Cl. 29—157.3)

This invention is directed to the art of metal joining and is more specifically concerned with a process for soldering tubes into a header sheet. This invention has been particularly developed for use in the production of internal combustion engine cooling radiators, but is by no means so limited.

In the production of internal combustion engine radiators it is essential that the vertical cooling tubes be secured to the header sheets forming parts of the upper and lower tanks in a manner which will be leakproof and permit the ready transfer of heat. It is also essential that this be done with the use of a minimum amount of solder and with the use of a solder containing as low a percentage of tin as possible. Such a process should also be amenable to execution by machine or by unskilled labor with uniformly satisfactory results. The instant invention has been developed in an endeavor to satisfy these requirements.

This invention is best understood if considered in conjunction with the figures of drawing in which Figure 1 is a plan view of a radiator tank, and Figure 2 is a cross section of a radiator tank at one stage of manufacture, and Figure 3 is a cross section view of the same tank at a later stage of manufacture, and Figure 4 is an outline drawing of this tank showing certain tubes and fins added, and Figure 5 is a cross section of the tank shown in Figures 1, 2 and 3 after complete assembly and soldering.

Referring to Figure 1 the header or tank is indicated generally by the numeral 10. A portion of this tank is provided with numerous perforations 11 for the reception of tubes 13 (note Figure 5). A close study of Figures 2, 3 and 5 will disclose that perforations 11 are formed by simply displacing the metal involved in the same direction as the tubes to be inserted will follow. Otherwise stated, no metal is cut away to provide perforations 11. This displaced metal provides collars 15 which surround the tubes as shown again in Figure 5.

After perforations 11 have been provided in header or tank 10 a solder washer 12 (Figure 2) is added. This solder washer has been previously pre-formed to fit snugly around each of the many perforations 11 in header 10. While the precise structure specified here is not necessary, it is preferred to use a solder comprising 35 percent tin and 65 percent lead and to make the thickness of the washer about forty thousandths of an inch.

After the solder washer has been assembled into the header 10 the assemblage is passed with the solder washer upwards through an oven heated to a temperature which will raise the temperature of solder washer 12 to about 525° Fahrenheit. This will partially but not completely fuse solder washer 12 and cause it to slump into the position in Figure 3 and to partially adhere to header 10.

The radiator core comprising tubes 13 and fins 14 is then assembled to header 10 as shown in Figure 4 and passed over open flames as shown in this figure. This application of direct heat causes the solder to completely melt and produce the finished solder joint depicted in Figure 5. By proceeding in this fashion oxidation of header 10 by exposure to open flame is avoided by the expedient of interposing solder washer 12 between the flame and the oxidizable header. A substantial reduction in leaks has been produced.

I claim as my invention:

1. The process of soldering the tubes of a radiator core to a header comprising perforating said header to receive said tubes, the metal involved in said perforating step being at least in part pushed out in the direction in which the tubes move during assembly so as to provide a collar abutting the respective tubes, forming a solder washer to fit closely over said collars, fitting said solder washer snugly over said collars, heating said header and solder washer to a temperature sufficient to securely bond the solder washer to the header but not sufficient to completely fuse said washer, assembling the core and header into the final assembled position and exposing the solder washer to heat sufficient to completely fuse the solder washer and solder the tubes securely to the header.

2. The process of soldering the tubes of a radiator to a header comprising perforating said header to receive said tubes, the metal involved in said perforating step being at least in part pushed out in the direction in which the tubes move during assembly so as to provide collars abutting the respective tubes, forming a solder washer to fit closely over said collars, heating said header and solder washer to a temperature sufficient to securely bond the solder washer to the header, but not sufficient to completely fuse said washer, assembling the core and header into the final assembled position and exposing the solder washer to direct flame to completely fuse the solder washer and solder the tubes securely to the header.

3. The process of soldering the tubes of a radiator core to a header comprising perforating said header to receive said tubes, the metal involved in said perforating step being at least in part pushed out in the direction in which the tubes move during assembly so as to provide collars abutting the respective tubes, forming a solder washer comprising 35 percent tin and 65 percent lead washer to fit closely over said collars, fitting said solder washer snugly over said collars, heating said header and solder washer to a temperature of approximately 525° Fahrenheit to securely bond a solder washer to the header without completely fusing said washer, assembling the collar and header into the final assembled position and exposing the solder washer to heat sufficient to completely fuse the solder washer and solder the tubes directly to the header.

4. The process of soldering the tubes of a radiator core to a header comprising perforating said header to receive said tubes, the metal involved in said perforating being at least in part pushed out in the direction in which the tubes move during assembly so as to provide collars abutting the respective tubes, forming a solder washer comprising 35 percent tin and 65 percent lead to fit closely over said collars, fitting said solder washer snugly over said collars, heating said header and solder washer to a temperature of approximately 525° Fahrenheit to securely bond a solder washer to the header without completely fusing said washer, assembling the core and header into the final assembled position and exposing the solder washer to direct flame to completely fuse a solder washer and solder the tubes to the header.

5. The process of soldering the tubes of a radiator core to a header comprising perforating said header to receive said tubes, the metal involved in said perforating steps being at least in part pushed out in the direction in which the tubes move during assembly so as to provide collars abutting the respective tubes, forming a solder washer to fit closely over said collars fitting said solder washers snugly over said collars, turning the assembly so that the washer is held rigid by gravity against the header, heating said header and solder washer to a temperature sufficient to securely bond a solder washer to the header but not sufficient to completely fuse said washer, assembling the core and header into the final assembled position and exposing the solder washer to heat sufficient to completely fuse the solder washer and solder the tubes securely to the header.

References Cited in the file of this patent

UNITED STATES PATENTS

| | | |
|---|---|---|
| 1,171,899 | Still | Feb. 15, 1916 |
| 1,801,171 | Mueller et al. | Apr. 14, 1931 |
| 2,023,931 | McCullough | Dec. 10, 1935 |
| 2,232,562 | Sandberg | Feb. 18, 1941 |
| 2,390,890 | MacFarland | Dec. 11, 1945 |
| 2,414,159 | Modine | Jan. 14, 1947 |
| 2,479,047 | Long | Aug. 16, 1949 |
| 2,503,429 | Ziegler | Apr. 11, 1950 |
| 2,788,195 | Karmazin | Apr. 9, 1957 |

OTHER REFERENCES

Welding Handbook, 3rd edition, 1950 pp. 516–517, published by American Welding Society.